(12) United States Patent
Yoon et al.

(10) Patent No.: US 10,196,048 B2
(45) Date of Patent: Feb. 5, 2019

(54) CASTER CAPABLE OF REMOVING FOREIGN SUBSTANCE

(71) Applicant: DONG YANG LOGITECH CO., LTD., Gyeonggi-do (KR)

(72) Inventors: Hyeong Min Yoon, Gyeonggi-do (KR); Duk Kon Ryoo, Gyeonggi-do (KR)

(73) Assignee: DONG YANG LOGITECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/506,516

(22) PCT Filed: Aug. 25, 2015

(86) PCT No.: PCT/KR2015/008870
§ 371 (c)(1),
(2) Date: Feb. 24, 2017

(87) PCT Pub. No.: WO2016/032205
PCT Pub. Date: Mar. 3, 2016

(65) Prior Publication Data
US 2017/0267217 A1    Sep. 21, 2017

(30) Foreign Application Priority Data
Aug. 25, 2014 (KR) .................. 10-2014-0110788

(51) Int. Cl.
*B60S 1/68* (2006.01)
*B60B 33/00* (2006.01)
(Continued)

(52) U.S. Cl.
CPC ............... *B60S 1/68* (2013.01); *B60B 33/00* (2013.01); *B60B 33/0039* (2013.01);
(Continued)

(58) Field of Classification Search
CPC ....... B60S 1/68; B60B 33/00; B60B 33/0039; B60B 33/045; B60B 33/0049;
(Continued)

(56) References Cited

U.S. PATENT DOCUMENTS 2,046,384 A * 7/1936 Katcher .................. B60B 33/00
15/159.1
2,471,958 A * 5/1949 Humphreys ............ B60B 33/00
16/18 CG
(Continued)

FOREIGN PATENT DOCUMENTS

KR    1020020026662    4/2002
KR    1020070009213    1/2007
(Continued)

*Primary Examiner* — William L Miller
(74) *Attorney, Agent, or Firm* — IPLA P.A.; James E. Bame (57) ABSTRACT

A caster capable of removing a foreign substance includes a flange mounted to a carrier or a plate on which cargo is loaded so as to be spaced apart from a lower surface of the carrier or the plate, the flange having a plurality of coupling holes formed therein, a rotator rotatably mounted to a lower surface of the flange, lower support members mounted respectively to opposite sides of the rotator, each lower support member having a rotating shaft coupling hole formed in a lower portion thereof, a wheel located between the lower support members and supported by a rotating shaft, which penetrates the rotating shaft coupling hole, and a foreign substance removal device fixed to and supported by the rotating shaft, the foreign substance removal device serving to remove and collect the foreign substance attached to a surface of the wheel that is being rotated.

6 Claims, 6 Drawing Sheets

(51) Int. Cl.
*B60B 33/04* (2006.01)
*B60R 19/00* (2006.01)

(52) U.S. Cl.
CPC ............ *B60B 33/045* (2013.01); *B60R 19/00* (2013.01); *B60B 33/0049* (2013.01); *B60B 33/0057* (2013.01); *B60B 33/0068* (2013.01); *B60B 2900/211* (2013.01); *Y10T 16/207* (2015.01)

(58) Field of Classification Search
CPC ............ B60B 33/0057; B60B 33/0068; B60B 2900/211; Y10T 16/18; Y10T 16/186; Y10T 16/203; Y10T 16/207; Y10T 16/216; B60R 19/00
USPC ........................ 16/18 R, 18 CG, 41, 20, 31 R
See application file for complete search history.

(56) References Cited

U.S. PATENT DOCUMENTS

| | | | | |
|---|---|---|---|---|
| 3,744,080 | A * | 7/1973 | Smith, Jr. | ............... B60B 33/00 15/256.51 |
| 3,964,124 | A * | 6/1976 | Crawford | ............... B60B 33/00 16/18 CG |
| 5,615,450 | A * | 4/1997 | Butler | ..................... B60B 33/00 16/18 CG |
| 9,067,570 | B2 * | 6/2015 | Kueppers | ................. B60S 1/68 |
| 9,346,438 | B1 * | 5/2016 | Parker, III | ................ B60S 1/68 |
| 2015/0246579 | A1 * | 9/2015 | Stone | ................. B60B 33/0023 16/18 CG |

FOREIGN PATENT DOCUMENTS

| | | | |
|---|---|---|---|
| KR | 1020140065316 | | 5/2014 |
| KR | 20150029232 | A * | 3/2015 |

\* cited by examiner

CASTER CAPABLE OF REMOVING FOREIGN SUBSTANCE

BACKGROUND

The present invention relates to a caster capable of removing foreign substances, and more particularly, to a caster capable of removing foreign substances, which enables easy removal and collection of foreign substances attached to a wheel thereof.

BACKGROUND ART

Generally, a caster is a wheeled device, which is coupled to the lower side of a transportation appliance so as to freely change the movement direction. The caster is used in various places according to the use purpose thereof.

In addition, in the case of a caster that is used outdoors, a large amount of foreign substances is attached to the outer circumferential surface of a wheel. In the case of a caster that is used in a relatively clean indoor environment, a relatively small amount of foreign substances is attached to the outer circumferential surface of a wheel.

On the other hand, in the case of a caster that is used both outdoors and indoors, a large amount of foreign substances, having become attached to a wheel outdoors, may be introduced indoors, causing contamination of the indoor environment with the foreign substances.

In order to solve the problem described above, Korean Patent Laid-Open Publication No. 10-2007-0009213 discloses technology for removing foreign substances that are attached to the outer circumferential surface of a wheel using a roll brush that is rotatably installed to pivot arms.

However, the conventional caster is inconvenient to assemble because both ends of a shaft, by which the roll brush is supported, need to be fastened and fixed using nuts or the like after being inserted into and supported by the pivot arms.

In addition, the conventional caster may not easily remove foreign substances attached to the outer circumferential surface of the wheel because the roll brush is rotated via the rotation of the wheel.

SUMMARY OF THE INVENTION

Therefore, the present invention has been made in view of the above problems, and it is one object of the present invention to provide a caster, which enables the automated removal and collection of foreign substances attached to a wheel using a foreign substance removal device that is fixed to and supported by a rotating shaft.

In addition, it is another object of the present invention to provide a caster, which may use an accommodation support plate, which is mounted below a brush, to prevent foreign substances from falling down to the ground.

In accordance with an aspect of the present invention, the above and other objects can be accomplished by the provision of a caster capable of removing a foreign substance, the caster including a flange mounted to a carrier or a plate on which cargo is loaded so as to be spaced apart from a lower surface of the carrier or the plate, the flange having a plurality of coupling holes formed therein, a rotator rotatably mounted to a lower surface of the flange, lower support members mounted respectively to opposite sides of the rotator, each lower support member having a rotating shaft coupling hole formed in a lower portion thereof, a wheel located between the lower support members and supported by a rotating shaft, which penetrates the rotating shaft coupling hole, and a foreign substance removal device fixed to and supported by the rotating shaft, the foreign substance removal device serving to remove and collect the foreign substance attached to a surface of the wheel that is being rotated.

In addition, the foreign substance removal device may include a pair of connection members, each of which includes a lower fixing portion coupled to the rotating shaft, which is located between the lower support members and the wheel, and a hinge coupling portion and a spring support portion at a side opposite the lower fixing portion, an accommodation box located between one connection member and the other connection member, the accommodation box being rotated about an accommodation coupling portion, which is coupled to the hinge coupling portion, a brush mounted to a front surface of the accommodation box and serving to remove the foreign substance attached to the wheel, a return spring having one side connected to the accommodation box and an opposite side connected to the spring support portion, and a stopper formed on the connection member and serving to limit an operating range of the accommodation box.

In addition, the accommodation box may be attachably and detachably provided with an accommodation support plate, and the accommodation support plate may be located below the brush so as to guide the foreign substance to the accommodation box.

In addition, the accommodation box may include an accommodation space portion in which an accommodation space is formed, side plates disposed respectively at opposite sides of the accommodation space portion and formed of a transparent material, each side plate having a hinge coupling hole formed in an upper portion thereof, and a discharge slide mounted to one side of the accommodation space portion and serving to discharge the foreign substance, accommodated in the accommodation space portion, to an outside via sliding thereof.

According to the present invention, a foreign substance removal device, which is fixed to and supported by a rotating shaft, may automatically remove and collect foreign substances attached to a wheel, and may also simply collect the foreign substances in an accommodation box via rotation thereof.

In addition, an accommodation support plate, which is mounted below a brush, may prevent the foreign substances from falling down to the ground, and may also guide the foreign substances attached to the wheel to the accommodation box using an inclined guide.

DETAILED DESCRIPTION OF THE INVENTION

Hereinafter, the embodiments of the present invention will be described in detail with reference to the accompanying drawings so as to allow those skilled in the art to easily implement the present invention. However, the present invention may be modified in various ways and is not limited to the embodiment described herein. The same or like elements are designated by the same reference numerals throughout the specification.

Figure 1:
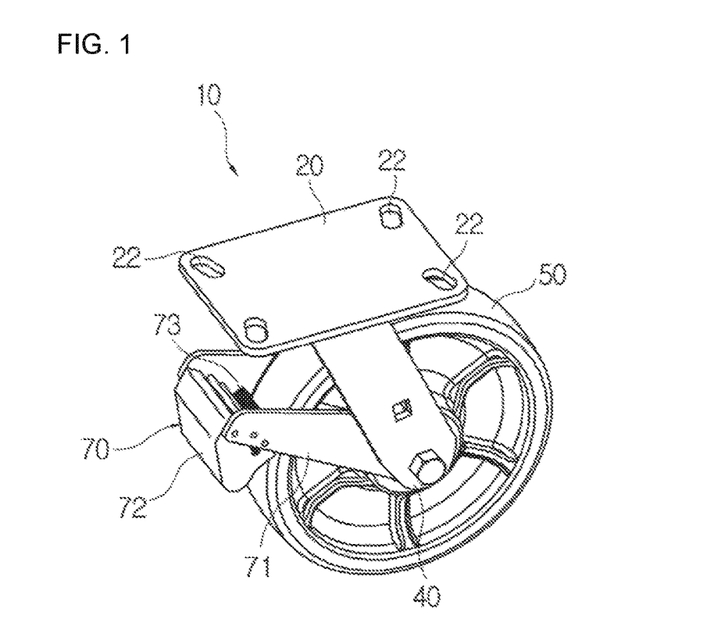
FIG. 1 is a perspective view illustrating a caster capable of removing foreign substances according to the present invention.
Figure 2:
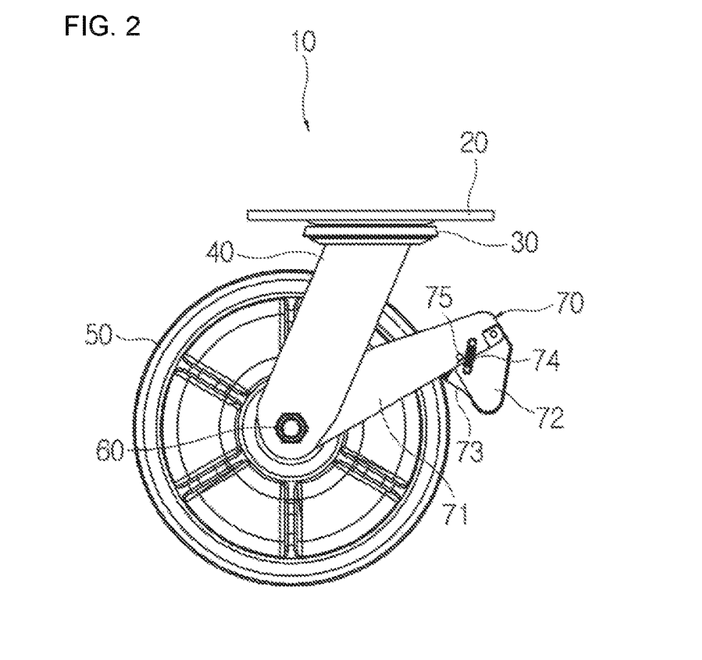
FIG. 2 is a side view illustrating the caster capable of removing foreign substances according to the present invention.
Figure 3:
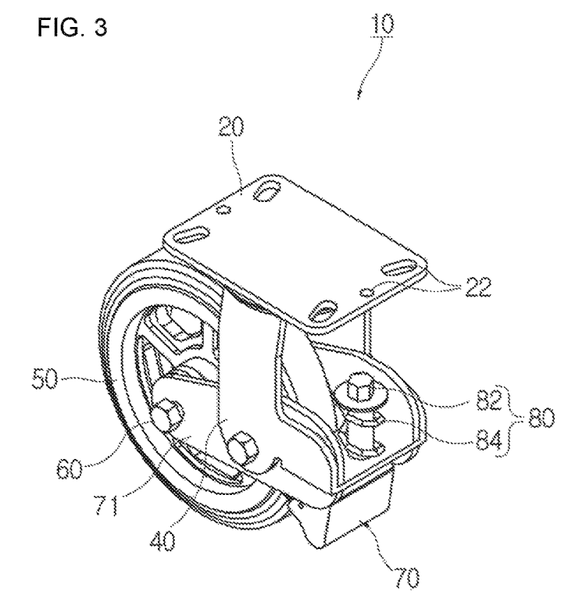
FIGS. 3 and 4 are views illustrating another embodiment of a lower support member constituting the caster capable of removing foreign substances according to the present invention.
Figure 4:
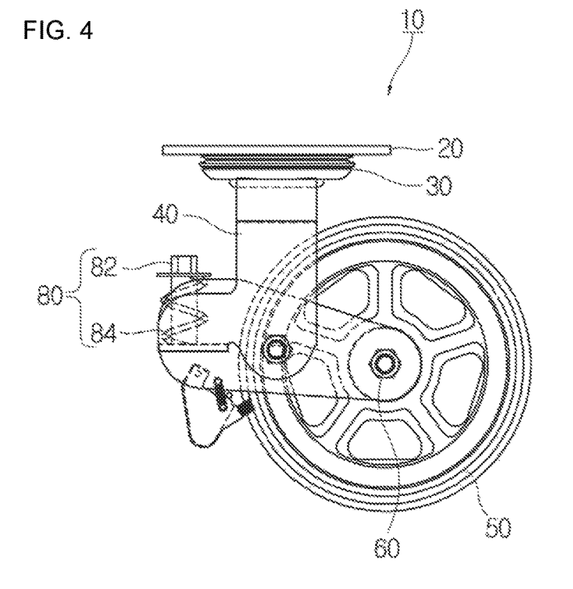
Figure 5:
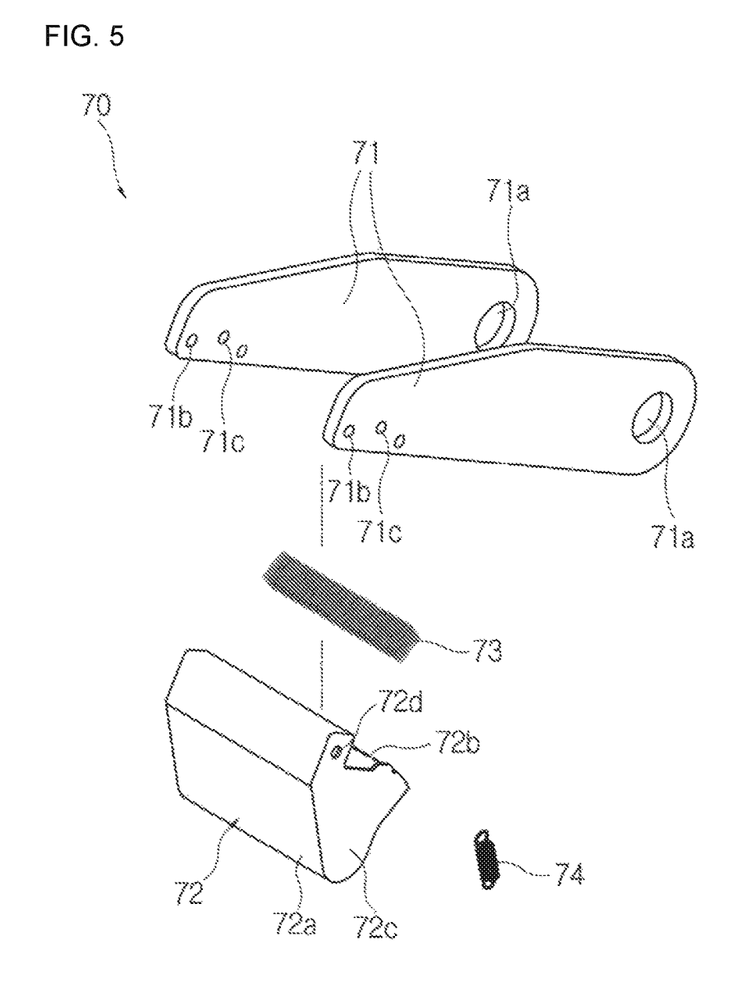
FIG. 5 is an exploded perspective view illustrating a foreign substance removal device constituting the caster capable of removing foreign substances according to the present invention.
Figure 6:
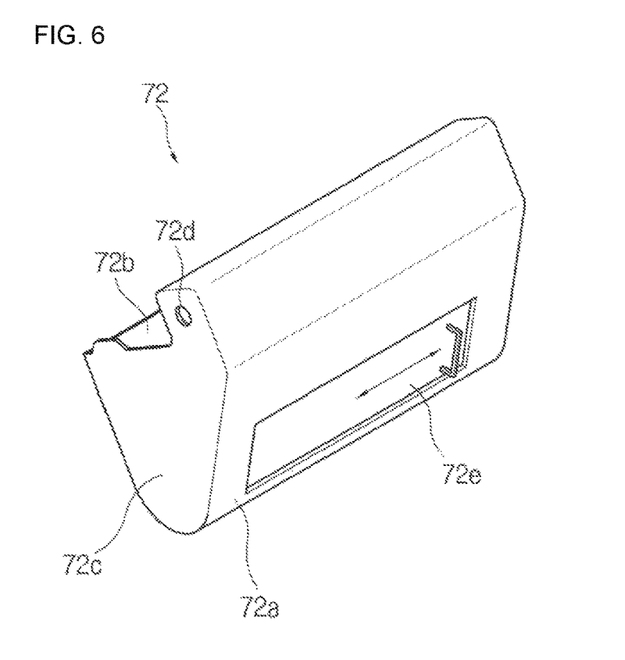
FIG. 6 is a view illustrating another embodiment of an accommodation box constituting the caster capable of removing foreign substances according to the present invention.
Figure 7:
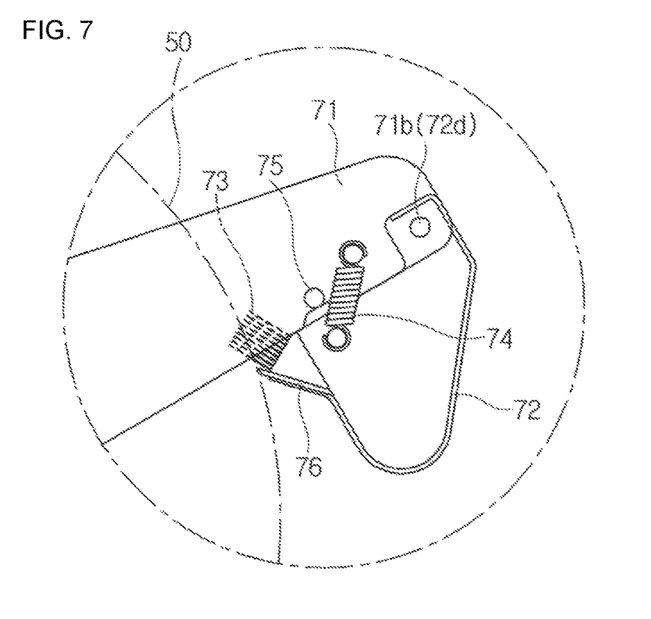
FIGS. 7 and 8 are views illustrating other embodiments of the foreign substance removal device constituting the caster capable of removing foreign substances according to the present invention.
Figure 8:
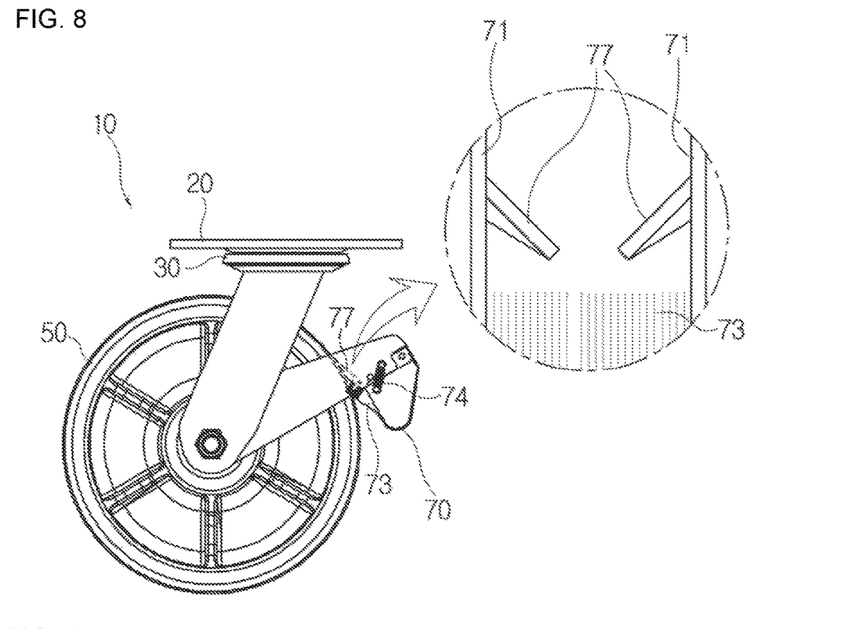

Hereinafter, the configuration of the present invention will be described with reference to the accompanying drawings. FIG. 1 is a perspective view illustrating a caster capable of removing foreign substances according to the present invention, FIG. 2 is a side view illustrating the caster capable of removing foreign substances according to the present invention, FIGS. 3 and 4 are views illustrating another embodiment of a lower support member constituting the caster capable of removing foreign substances according to the present invention, FIG. 5 is an exploded perspective view illustrating a foreign substance removal device constituting the caster capable of removing foreign substances according to the present invention, FIG. 6 is a view illustrating another embodiment of an accommodation box constituting the caster capable of removing foreign substances according to the present invention, and FIGS. 7 and 8 are views illustrating other embodiments of the foreign substance removal device constituting the caster capable of removing foreign substances according to the present invention.

The caster 10 capable of removing foreign substances according to the present invention includes a flange 20, a rotator 30 rotatably mounted to the lower surface of the flange 20, lower support members 40 mounted respectively to opposite sides of the rotator 30, and a foreign substance removal device 70 disposed between one lower support member 40 and the other lower support member 40, the foreign substance removal device 70 serving to remove and collect foreign substances attached to the surface of a wheel 50.

The flange 20 is mounted to a carrier or a plate on which cargo is loaded so as to be spaced apart from the lower surface of the carrier or the plate.

Here, the flange 20 has a predetermined size and is provided with coupling holes 22, which are formed near the corners thereof with a gap therebetween.

In addition, in the present invention, the flange 20 will be described by way of example as being a rectangular plate, which has a predetermined thickness and is provided in four corners thereof with the coupling holes 22.

The rotator 30, which is rotatably mounted to the lower surface of the flange 20, is rotatably operated via a bearing or a roller provided therein.

That is, the rotator 30 is rotated depending on the directional force transmitted through the wheel 50 and downwardly transmits the load from the flange 20.

Here, it is noted that any known flange may be selectively used instead of the flange 20 illustrated in the drawings.

The lower support members 40, which are mounted to the respective opposite sides of the rotator 30, have a predetermined width and height, and are provided in the lower portion thereof with respective rotating shaft coupling holes 42.

That is, each lower support member 40 takes the form of a plate having a predetermined thickness and height, is provided in the lower portion thereof with the rotating shaft coupling hole 42, and is fixed at the upper end thereof to the rotator 30.

Here, it is noted that the lower support member 40 may have an "Π"-shaped form, the front and rear sides and the lower side of which are open.

In addition, the lower support member 40 may be configured as illustrated in FIGS. 3 and 4. That is, one side of the lower support member 40 may be coupled to the rotator 30 and the opposite side may be mounted to the foreign substance removal device 70.

At this time, a shock absorbing device 80 is mounted to the connection portion of the foreign substance removal device 70.

That is, the lower support member 40 may have a right-angled shape, and the shock absorbing device 80 may be mounted to the connection portion between the foreign substance removal device 70 and the lower support member 40 so as to absorb shocks and to prevent the generation of noise.

The shock absorbing device 80 includes a fixing bolt 82, which is vertically mounted to the connection portion of a rotation support portion 40*a* and a wheel support portion 40*b*, which constitute the lower support member 40, and a shock absorbing spring 84, having one side supported by the rotation support portion 40*a* and the opposite side supported by the fixing bolt 82.

That is, the shock absorbing device 80 may serve to absorb shocks transmitted through the wheel 50 and to minimize the generation of vibrations in the lower support member 40 and the foreign substance removal device 70 using elastic force.

The wheel 50, which is disposed between one lower support member 40 and the other lower support member 40, has a predetermined thickness, is curved at the outer surface thereof, and is centrally provided with a through-hole 52, through which a rotating shaft 60 penetrates.

That is, the wheel 50 is located between the lower support members 40 and is supported by the rotating shaft 60 penetrating the rotating shaft coupling holes 42 so as to move on the ground.

The foreign substance removal device 70, which is fixed to and supported by the rotating shaft 60, serves to remove and collect foreign substances attached to the surface of the wheel that is being rotated.

In addition, the foreign substance removal device 70 may include, for example, a pair of connection members 71, each of which includes a lower fixing portion 71*a* coupled to the rotating shaft 60, which is located between the lower support members 40 and the wheel 50, and a hinge coupling portion 71*b* and a spring support portion 71*c* at the side opposite the lower fixing portion, an accommodation box 72, which is located between one connection member 71 and the other connection member 71 and is rotated about an accommodation coupling portion 72*d*, which is coupled to the hinge coupling portion 71b, a brush 73, which is mounted to the front surface of the accommodation box 72 to remove foreign substances attached to the wheel 50, a return spring 74, which is connected at one side thereof to the accommodation box 72 and is connected at the opposite side thereof to the spring support portion 71c, and a stopper 75, which is formed on the connection member 71 to limit the operating range of the accommodation box 72.

That is, the foreign substance removal device 70 is constructed by mounting the respective connection members 71 to the rotating shaft 60, which is located between the lower support members 40 and the wheel 50, subsequently mounting the accommodation box 72 between one connection member 71 and the other connection member 71, subsequently mounting the brush 73 to the front surface of the accommodation box 72 so as to come into contact with the wheel 50, and thereafter mounting the return spring 74 to both the lower support member 40 and the accommodation box 72.

Here, providing a supplementary description related to the accommodation box 72, after the foreign substances attached to the surface of the wheel 50 are collected in the accommodation box 72 via the brush 73, the accommodation box 72 is rotated at 90 degrees or more about the accommodation coupling portion 72a, which is coupled to the hinge coupling portion 71b, so as to discharge the foreign substances outward. Then, the accommodation box 72 returns to and remains in the initial state via the return spring 74 and the stopper 75.

In addition, the accommodation box 72 may include an accommodation space portion 72a in which an accommodation space 72b is formed, side plates 72c, which are disposed respectively at opposite sides of the accommodation space portion 72a and are provided in the upper portion thereof with the respective accommodation coupling portions 72d, and a discharge slide 72e, which is mounted to one side of the accommodation space portion 72a and discharges the foreign substances, accommodated in the accommodation space 72b in the accommodation space portion 72a, to the outside via sliding thereof.

At this time, the side plates 72c may be formed of a transparent material to allow a user to check the foreign substances accommodated in the accommodation space 72b in the accommodation space portion 72a in real time and thereafter discharge the foreign substances through the discharge slide 72e.

Next, the foreign substance removal device 70 may be configured as illustrated in FIGS. 7 and 8.

First, the foreign substance removal device 70 illustrated in FIG. 7 illustrates an example in which an accommodation support plate 76 is attachably and detachably mounted to the front surface of the accommodation box 72.

That is, when the accommodation support plate 76 is attachably and detachably mounted to the accommodation box 72, which is located below the brush 73, the foreign substance removal device 70 may allow the foreign substances passing through the brush 73 to be collected in the accommodation box 72.

Providing a supplementary description thereto, when the accommodation support plate 76, which is located below the brush 73 and is attachably and detachably mounted to the accommodation box 72, is used along with the brush 73, the foreign substances attached to the surface of the wheel 50 may be completely removed.

At this time, the inlet of the accommodation box 72, into which the foreign substances are introduced, may of course be formed at a low height.

Next, the foreign substance removal device 70 illustrated in FIG. 8 is configured in such a manner that inclined guides 77 are mounted to the respective connection members 71, which are located above the brush 73, so as to remove the foreign substances attached to the wheel 50 and to centrally collect the foreign substances.

That is, the inclined guides 77 are obliquely mounted to the respective connection members 71 so as to face each other, thereby serving to remove the foreign substances attached to the wheel 50 and to centrally collect the foreign substances.

An embodiment of the caster capable of removing foreign substances having the above-described configuration will be described below for reference.

First, after the flange 20, which has a predetermined size and is provided with the coupling holes 22 near the corners thereof with a gap therebetween, is formed, the rotator 30 is mounted to the lower surface of the flange 20.

Then, the lower support members 40, which have a predetermined width and height and are formed in the lower portion thereof with the respective rotating shaft coupling holes 42, are mounted respectively to opposite sides of the rotator 30.

Subsequently, the wheel 50, which has a predetermined thickness, is curved at the outer surface thereof, and is centrally provided with the through-hole 52 for the penetration of the rotating shaft 60, is mounted between one lower support member 40 and the other lower support member 40.

Subsequently, when the foreign substance removal device 70, which includes the pair of connection members 71, each of which includes the lower fixing portion 71a coupled to the rotating shaft 60, which is located between the lower support members 40 and the wheel 50, and the hinge coupling portion 71b and the spring support portion 71c at the side opposite the lower fixing portion, the accommodation box 72, which is located between one connection member 71 and the other connection member 71 and is rotated about the accommodation coupling portion 72d, which is coupled to the hinge coupling portion 71b, the brush 73, which is mounted to the front surface of the accommodation box 72 to remove foreign substances attached to the wheel 50, the return spring 74, which is connected at one side thereof to the accommodation box 72 and is connected at the opposite side thereof to the spring support portion 71c, and the stopper 75, which is formed on the connection member 71 to limit the operating range of the accommodation box 72, is mounted, the assembly of the caster 10 capable of removing foreign substances is completed.

Here, the assembly sequence of the caster capable of removing foreign substances may have a configuration different from the above-described configuration.

Next, the use state of the caster capable of removing foreign substances having the above-described configuration will be described.

Figure 9:
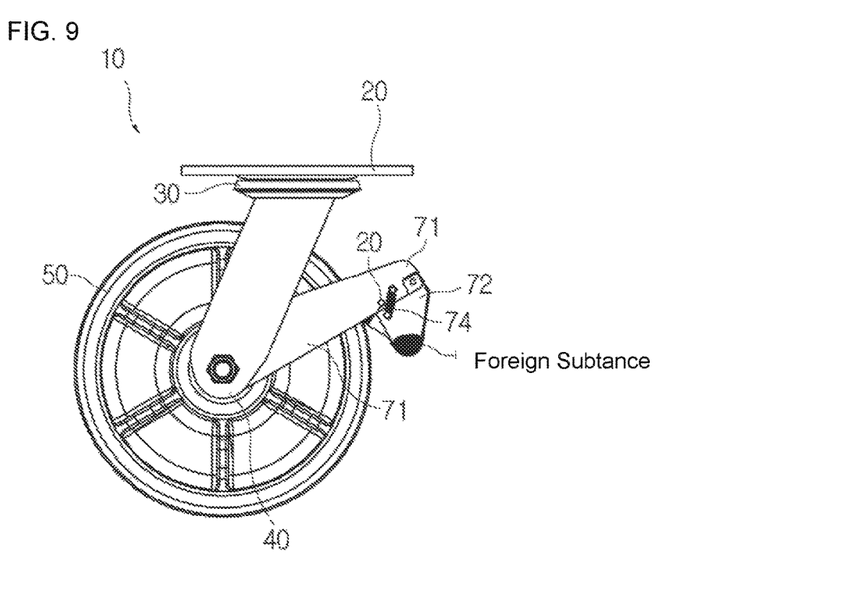
FIGS. 9 and 10 are side views illustrating the use state of the caster capable of removing foreign substances according to the present invention.
Figure 10:
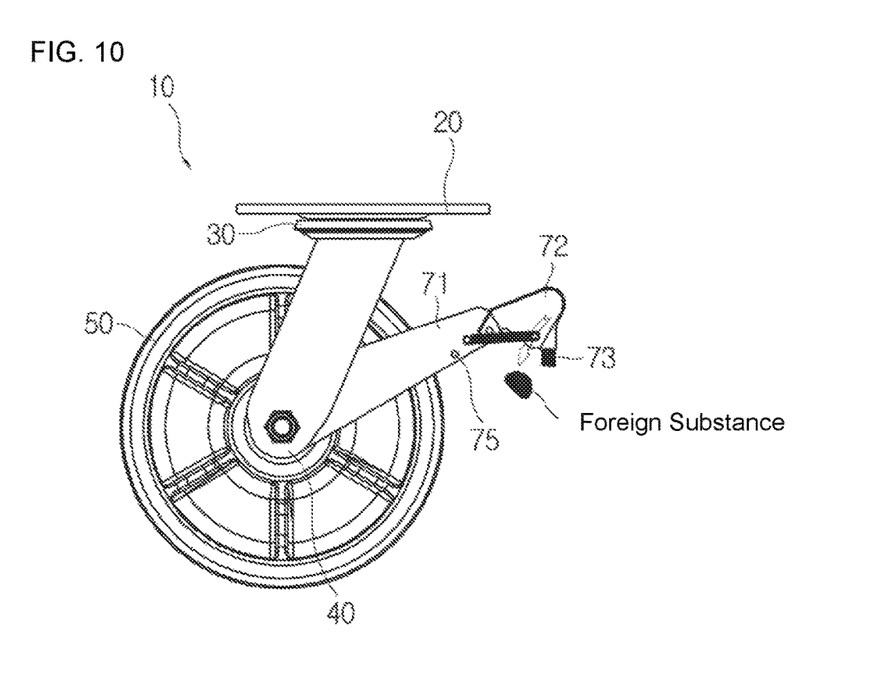

First, after the caster 10 capable of removing foreign substances is mounted to a carrier or a plate on which cargo is loaded so as to be spaced apart from the lower surface of the carrier or the plate, the carrier or the plate, to which the caster 10 capable of removing foreign substances is mounted, is used indoors or outdoors according to the use purpose thereof.

In addition, when force is applied to the carrier or plate used indoors or outdoors, the wheel 50, which constitutes the caster 10 capable of removing foreign substances, is moved in the direction in which the force is transmitted, thereby moving the carrier or the plate in a desired direction.

At this time, the foreign substances attached to the surface of the wheel 50 are continuously and automatically collected via the foreign substance removal device 70.

That is, when the wheel 50 is rotated in the direction of travel, the brush 73, which is in close contact with the surface of the wheel 50, removes the foreign substances attached to the surface of the wheel 50 and guides the removed foreign substances into the accommodation box 72 due to the inclination angle of the brush 73.

Next, when it is desired to remove the foreign substances collected inside the accommodation box 72, the accommodation box 72 is rotated at 90 degrees or more about the accommodation coupling portion 72d thereof and a process of outwardly discharging the foreign substances collected inside the accommodation box 72 is continually performed.

At this time, when the force applied to rotate the accommodation box 72 is released after the foreign substances are discharged, the accommodation box 72 returns to and remains in the initial state thereof via the return spring 74.

In this way, the caster capable of removing foreign substances may have an advantage of automatically removing and collecting the foreign substances attached to the wheel via the foreign substance removal device, which is fixed to and supported by the rotating shaft.

Although the embodiment of the present invention has been described above, modifications and variations of the present invention can be made via additions, modifications and omission of constituent elements by those skilled in the art without departing from the gist of the appended claims. Thus, it is intended that the modifications and variations should not be understood independently of the technical sprit or prospect of the disclosure.

The invention claimed is:

1. A caster capable of removing a foreign substance, the caster comprising:
a flange mounted to a carrier or a plate on which cargo is loaded so as to be spaced apart from a lower surface of the carrier or the plate, the flange having a plurality of coupling holes formed therein;
a rotator rotatably mounted to a lower surface of the flange;
lower support members mounted respectively to opposite sides of the rotator, each lower support member having a rotating shaft coupling hole formed in a lower portion thereof;
a wheel located between the lower support members and supported by a rotating shaft, which penetrates the rotating shaft coupling hole; and
a foreign substance removal device fixed to and supported by the rotating shaft, the foreign substance removal device serving to remove and collect the foreign substance attached to an outer circumferential surface of the wheel that is being rotated,
wherein each of the lower support members has one side coupled to the rotator and an opposite side mounted to the foreign substance removal device, and is provided with a shock absorbing device mounted to a connection portion of the foreign substance removal device and the lower member.

2. The caster according to claim 1, wherein the shock absorbing device includes:
a fixing bolt vertically mounted to a connection portion of a rotation support portion and a wheel support portion, which constitute each lower support member; and
a shock absorbing spring having one side supported by the rotation support portion and an opposite side supported by the fixing bolt.

3. A caster capable of removing a foreign substance, the caster comprising:
a flange mounted to a carrier or a plate on which cargo is loaded so as to be spaced apart from a lower surface of the carrier or the plate, the flange having a plurality of coupling holes formed therein;
a rotator rotatably mounted to a lower surface of the flange;
lower support members mounted respectively to opposite sides of the rotator, each lower support member having a rotating shaft coupling hole formed in a lower portion thereof;
a wheel located between the lower support members and supported by a rotating shaft, which penetrates the rotating shaft coupling hole; and
a foreign substance removal device fixed to and supported by the rotating shaft, the foreign substance removal device serving to remove and collect the foreign substance attached to an outer circumferential surface of the wheel that is being rotated,
wherein the foreign substance removal device includes:
a pair of connection members, each of which includes a lower fixing portion coupled to the rotating shaft, which is located between the lower support members and the wheel, and a hinge coupling portion and a spring support portion at a side opposite the lower fixing portion;
an accommodation box located between one connection member and the other connection member, the accommodation box being rotated about an accommodation coupling portion, which is coupled to the hinge coupling portion;
a brush mounted to a front surface of the accommodation box and serving to remove the foreign substance attached to the wheel;
a return spring having one side connected to the accommodation box and an opposite side connected to the spring support portion; and
a stopper formed on the connection member and serving to limit an operating range of the accommodation box.

4. The caster according to claim 3, wherein the accommodation box includes:
an accommodation space portion in which an accommodation space is formed;
side plates disposed respectively at opposite sides of the accommodation space portion, each side plate having the accommodation coupling portion formed in an upper portion thereof; and
a discharge slide mounted to one side of the accommodation space portion and serving to discharge the foreign substance, accommodated in the accommodation space portion, to an outside via sliding thereof.

5. The caster according to claim 3, wherein the accommodation box is attachably and detachably provided with an accommodation support plate, and the accommodation support plate is located below the brush so as to guide the foreign substance to the accommodation box.

6. The caster according to claim 3, wherein the connection members are located above the brush, and are provided with respective inclined guides so as to scrape the foreign substance attached to the wheel and to guide the foreign substance to the accommodation box.

* * * * *